United States Patent
Suzuki et al.

(10) Patent No.: US 9,246,581 B2
(45) Date of Patent: Jan. 26, 2016

(54) COMMUNICATION LIGHT DETECTING STRUCTURE, COMMUNICATION LIGHT DETECTING OPTICAL CONNECTOR INCLUDING THE COMMUNICATION LIGHT DETECTING STRUCTURE, AND COMMUNICATION LIGHT DETECTING OPTICAL CABLE INCLUDING THE COMMUNICATION LIGHT DETECTING STRUCTURE

(71) Applicant: Hitachi Metals, Ltd., Tokyo (JP)

(72) Inventors: Kanako Suzuki, Hitachi (JP); Yoshihiro Nakatani, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 14 days.

(21) Appl. No.: 14/244,785

(22) Filed: Apr. 3, 2014

(65) Prior Publication Data
US 2014/0314403 A1   Oct. 23, 2014

(30) Foreign Application Priority Data
Apr. 18, 2013   (JP) .................................. 2013-087414

(51) Int. Cl.
*H04B 10/08*   (2006.01)
*H04B 10/079*   (2013.01)
*G02B 6/28*   (2006.01)

(52) U.S. Cl.
CPC ............ *H04B 10/079* (2013.01); *G02B 6/2852* (2013.01); *H04B 10/0795* (2013.01)

(58) Field of Classification Search
CPC ............ H04B 10/0795; H04B 10/079; H04B 10/07955; H04B 10/0793; H04B 10/0775; G02B 6/2852

USPC ....................... 398/141, 20, 13, 28
See application file for complete search history.

(56) References Cited

U.S. PATENT DOCUMENTS

| | | | |
|---|---|---|---|
| 5,170,275 A * | 12/1992 | Large ........................... 398/204 |
| 7,248,762 B2 * | 7/2007 | Hallemeier et al. ............ 385/28 |
| 7,493,050 B2 * | 2/2009 | Evangelides, Jr. ............ 398/148 |
| 2010/0008676 A1 * | 1/2010 | Kojima et al. ................ 398/141 |
| 2013/0022316 A1 * | 1/2013 | Pelletier et al. ................. 385/37 |

FOREIGN PATENT DOCUMENTS

| | | | |
|---|---|---|---|
| JP | H 09-297227 A | 11/1997 |
| JP | H 11-295537 A | 10/1999 |

(Continued)

OTHER PUBLICATIONS

Japanese Office Action dated Jun. 23, 2015 with an English translation thereof.

*Primary Examiner* — M. R. Sedighian
(74) *Attorney, Agent, or Firm* — McGinn IP Law Group PLLC (57) ABSTRACT

A communication light detecting structure includes a communication optical fiber configured to transmit communication light; a leakage optical fiber optically connected to the middle of the communication optical fiber via optical connection portions, the leakage optical fiber being different in core refractive index from the communication optical fiber; and a light detecting unit configured to detect part of the communication light leaking from the optical connection portions as leakage light. A communication light detecting optical connector includes the communication light detecting structure. A communication light detecting optical cable includes the communication light detecting structure. The communication optical fiber and the leakage optical fiber may have the same core diameter. The communication optical fiber and the leakage optical fiber may have the same cladding refractive index.

20 Claims, 4 Drawing Sheets

(56) References Cited

FOREIGN PATENT DOCUMENTS

| JP | 2004-354732 A | 12/2004 |
| JP | 2009-276627 | * 11/2009 ............ G02B 6/42 |
| JP | 2009-276627 A | 11/2009 |
| JP | 2010-032650 A | 2/2010 |

* cited by examiner

COMMUNICATION LIGHT DETECTING STRUCTURE, COMMUNICATION LIGHT DETECTING OPTICAL CONNECTOR INCLUDING THE COMMUNICATION LIGHT DETECTING STRUCTURE, AND COMMUNICATION LIGHT DETECTING OPTICAL CABLE INCLUDING THE COMMUNICATION LIGHT DETECTING STRUCTURE

BACKGROUND OF THE INVENTION

1. Field of the Invention

The present invention relates to a communication light detecting structure capable of enabling the user to visually check the state of communication in a communication optical fiber, a communication light detecting optical connector including the communication light detecting structure, and a communication light detecting optical cable including the communication light detecting structure.

2. Description of the Related Art

In optical communication related facilities, such as data centers and stations, communication light transmitted through a communication optical fiber is often invisible light outside the visible light range. This means that the user cannot visually check the state of communication in the communication optical fiber.

Therefore, the communication optical fiber in use may be erroneously identified as not being in use, and an optical connector optically connected to the middle of the communication optical fiber may be removed by mistake. This may lead to serious failures in communication.

Techniques have been developed, which are capable of detecting the presence of communication light transmitted through a communication optical fiber without interrupting the communication, and are capable of enabling the user to visually check the state of communication in the communication optical fiber.

For example, there is a proposed technique in which a light transmissive resin, such as a refractive index matching agent, is charged into a gap in the middle of a communication optical fiber. Part of communication light scattered by the light transmissive resin is detected as leakage light by a light receiving element or the like, and the detected leakage light is converted to visible light. This enables the user to visually check the state of communication (see, e.g., Japanese Patent No. 4927028).

However, the amount of leakage light may be changed by entry of air bubbles during charging of the light transmissive resin, or by changes in refractive index of the light transmissive resin with changing environmental temperature. This results in significant product-to-product variations, and it is difficult to maintain a stable amount of leakage light over a long period of time.

SUMMARY OF THE INVENTION

Accordingly, an object of the present invention is to provide a communication light detecting structure that can achieve reduced product-to-product variations and maintain a stable amount of leakage light over a long period of time, a communication light detecting optical connector that includes the communication light detecting structure, and a communication light detecting optical cable that includes the communication light detecting structure.

The present invention made to achieve the object described above provides a communication light detecting structure that includes a communication optical fiber configured to transmit communication light; a leakage optical fiber optically connected to the middle of the communication optical fiber via optical connection portions, the leakage optical fiber being different in core refractive index from the communication optical fiber; and a light detecting unit configured to detect part of the communication light leaking from the optical connection portions.

The leakage optical fiber may have a length of 1 mm or more.

The communication optical fiber and the leakage optical fiber may have the same core diameter.

The communication optical fiber and the leakage optical fiber may have the same cladding refractive index.

The optical connection portions may each be formed by a fusion portion where the communication optical fiber and the leakage optical fiber are fused together.

The optical connection portions may each be formed by a butt portion where the communication optical fiber and the leakage optical fiber are butted against each other.

The communication optical fiber and the leakage optical fiber may be formed as a single optical fiber.

The communication light detecting structure may further include a protective member configured to cover the optical connection portions.

The communication light detecting structure may further include a reinforcing member configured to reinforce the optical connection portions.

The present invention also provides a communication light detecting optical connector including the communication light detecting structure.

The present invention also provides a communication light detecting optical cable including the communication light detecting structure.

According to the present invention, it is possible to provide a communication light detecting structure that can achieve reduced product-to-product variations and maintain a stable amount of leakage light over a long period of time, a communication light detecting optical connector that includes the communication light detecting structure, and a communication light detecting optical cable that includes the communication light detecting structure.

DESCRIPTION OF THE PREFERRED EMBODIMENTS

Preferred embodiments of the present invention will now be described with reference to the attached drawings.

Figure 1:
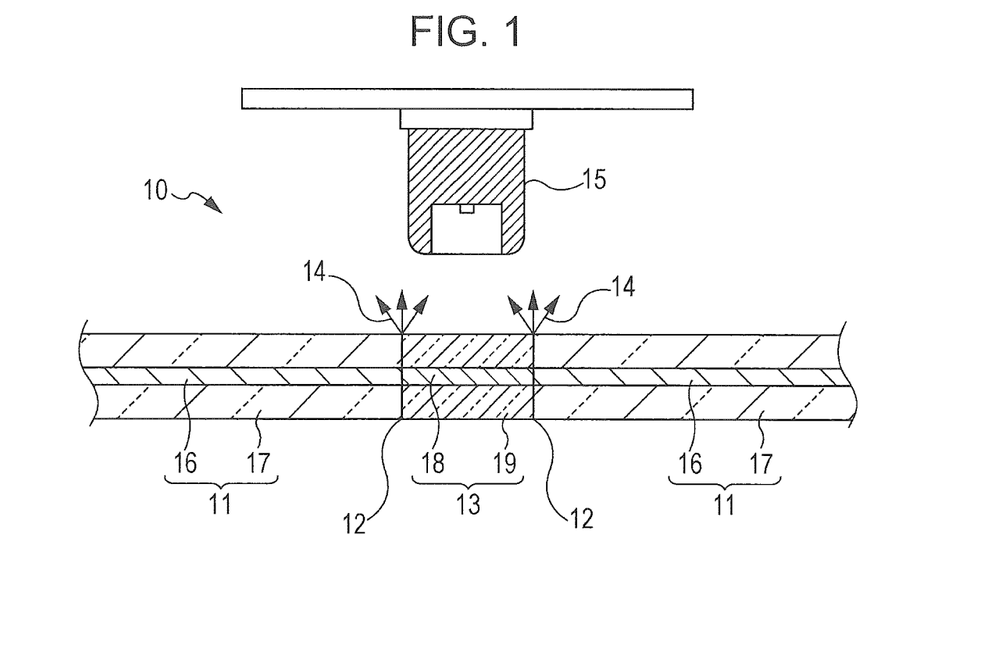
FIG. 1 is a cross-sectional schematic view of a communication light detecting structure according to an embodiment of the present invention.

As illustrated in FIG. 1, a communication light detecting structure 10 according to the present embodiment includes a communication optical fiber 11 configured to transmit communication light; a leakage optical fiber 13 optically connected to the middle of the communication optical fiber 11 via optical connection portions 12, the leakage optical fiber 13 being different in core refractive index from the communication optical fiber 11; and a light detecting unit 15 configured to detect part of the communication light leaking from the optical connection portions 12 as leakage light 14.

The communication optical fiber 11 includes a core 16 and a cladding 17. The core 16 is made, for example, of a material mainly composed of quartz, and is configured to transmit communication light. The cladding 17 is formed around the core 16, and has a refractive index lower than that of the core 16.

The communication optical fiber 11 is an optical transmission line configured to transmit communication light while allowing it to reflect off an interface between the core 16 and the cladding 17 and keeping it inside the core 16. The communication optical fiber 11 is formed, for example, by a typical single-mode or multi-mode optical fiber.

In the present embodiment, a graded-index multi-mode optical fiber is used as the communication optical fiber 11. The communication optical fiber 11 is optically connected at one end thereof to a server computer, and optically connected at the other end thereof to a client computer.

The optical connection portions 12 may each be formed by a butt portion where the communication optical fiber 11 and the leakage optical fiber 13 are butted against each other, but are each preferably formed by a fusion portion where the communication optical fiber 11 and the leakage optical fiber 13 are fused together. Using the optical connection portions 12 each formed by a butt portion requires an operation, such as end-face grinding, in consideration of an increase in connection loss caused by reflection of light or the like. In the case of using the optical connection portions 12 each formed by a fusion portion, it is possible to realize optical connection with little connection loss, simply by fusing the leakage optical fiber 13 in the middle of the communication optical fiber 11 cut by an optical fiber cutter. Therefore, using the optical connection portions 12 each formed by a fusion portion is preferable in terms of work efficiency and connection reliability.

However, this does not completely exclude the possibility of using the optical connection portions 12 one or each of which is formed by a butt portion. That is, one of the two optical connection portions 12 may be formed by a fusion portion and the other optical connection portion 12 may be formed by a butt portion, or the two optical connection portions 12 may each be formed by a butt portion.

The leakage optical fiber 13 includes a core 18 and a cladding 19. The core 18 is made, for example, of a material mainly composed of quartz, and is configured to transmit communication light. The cladding 19 is formed around the core 18, and has a refractive index lower than that of the core 18.

The leakage optical fiber 13 is an optical transmission line configured to transmit communication light while allowing it to reflect off an interface between the core 18 and the cladding 19 and keeping it inside the core 18. The leakage optical fiber 13 is formed, for example, by a typical single-mode or multi-mode optical fiber.

In the present embodiment, a graded-index multi-mode optical fiber is used as the leakage optical fiber 13. A relative refractive index difference between the core 18 and the cladding 19 of the leakage optical fiber 13 is greater than that between the core 16 and the cladding 17 of the communication optical fiber 11.

The communication optical fiber 11 and the leakage optical fiber 13 preferably have the same core diameter. This is because if the communication optical fiber 11 and the leakage optical fiber 13 have different core diameters, the number of parameters to be considered in setting the amount of the leakage light 14 is increased, and this makes the design task difficult.

Also, the communication optical fiber 11 and the leakage optical fiber 13 preferably have the same cladding diameter. This is because since ferrules of the same size can be used to hold the communication optical fiber 11 and the leakage optical fiber 13, the ferrules can be easily handled and the associated costs can be reduced.

Additionally, the claddings 17 and 19 of the communication optical fiber 11 and the leakage optical fiber 13 preferably have the same refractive index. This is because claddings of commonly available optical fibers often have a predetermined refractive index. Even in the case of manufacturing the communication optical fiber 11 and the leakage optical fiber 13 instead of using commonly available ones, since the claddings 17 and 19 having the same refractive index can be formed under the same conditions, it is possible to reduce the cost of manufacturing the communication optical fiber 11 and the leakage optical fiber 13.

That is, the communication optical fiber 11 and the leakage optical fiber 13 have the same configuration except that the cores 16 and 18 have different refractive indices.

The communication optical fiber 11 and the leakage optical fiber 13 are formed by different optical fibers in the embodiment described above. Alternatively, the communication optical fiber 11 and the leakage optical fiber 13 may be formed as a single optical fiber which is partially heated to partially change the core refractive index.

The light detecting unit 15 includes a light receiving element, such as a photodiode, and a light emitting element (communication state indication lamp), such as a light emitting diode, from which the leakage light 14 received by the light receiving element is output as visible light. The light detecting unit 15 is preferably placed at a position where a large amount of the leakage light 14 emerges. This is to achieve a high level of sensitivity while reducing the loss of communication light.

A large amount of the leakage light 14 emerges when communication light is transmitted from a core having a high refractive index to a core having a low refractive index. In the present embodiment where the refractive index of the core 18 of the leakage optical fiber 13 is higher than the refractive index of the core 16 of the communication optical fiber 11, the amount of the leakage light 14 is distributed as illustrated in FIG. 2.

Figure 2:
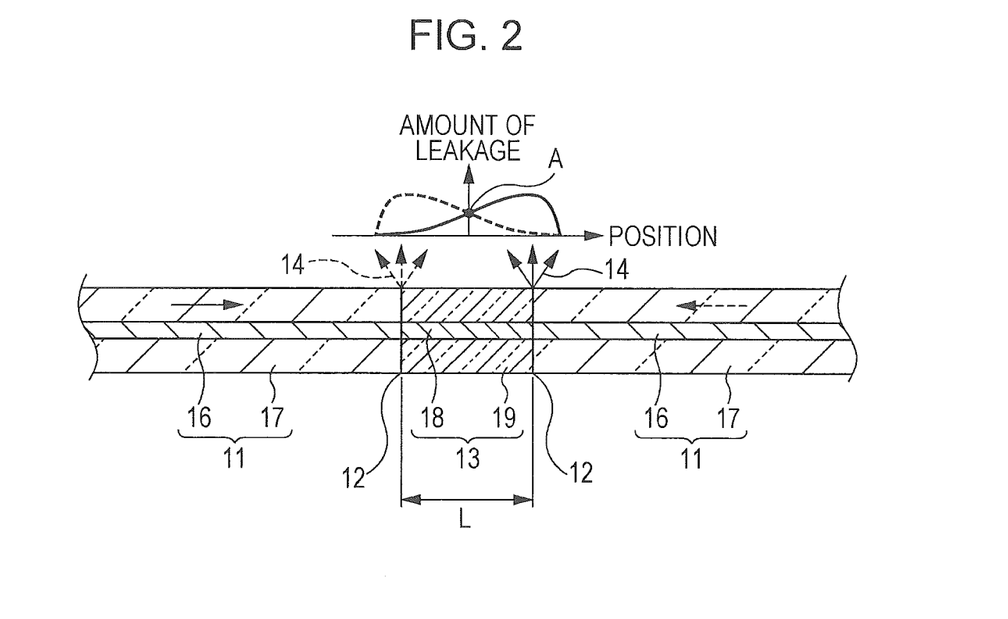
FIG. 2 illustrates how the amount of leakage light is distributed in the communication light detecting structure illustrated in FIG. 1.

For the communication light propagating from the left to right (as indicated by a solid arrow) in FIG. 2, the amount of the leakage light 14 reaches a maximum at the optical connection portion 12 on the right in FIG. 2. For the communication light propagating from the right to left (as indicated by a dashed arrow) in FIG. 2, the amount of the leakage light 14 reaches a maximum at the optical connection portion 12 on the left in FIG. 2.

A length L of the leakage optical fiber 13 is decreased to shift each position of the maximum amount of the leakage light 14, in the right-to-left direction in FIG. 2, such that an intersection point A of the distributions of the amount of the leakage light 14 at the optical connection portions 12 on the right and left in FIG. 2 has a value that can be detected at least by the light detecting unit 15, and such that the value of the intersection point A is maximized. At the same time, the light detecting unit 15 is placed above the intersection point A. Thus, when the communication light propagates in either direction, the presence of the communication light can be detected by the single light detecting unit 15.

Figure 3:
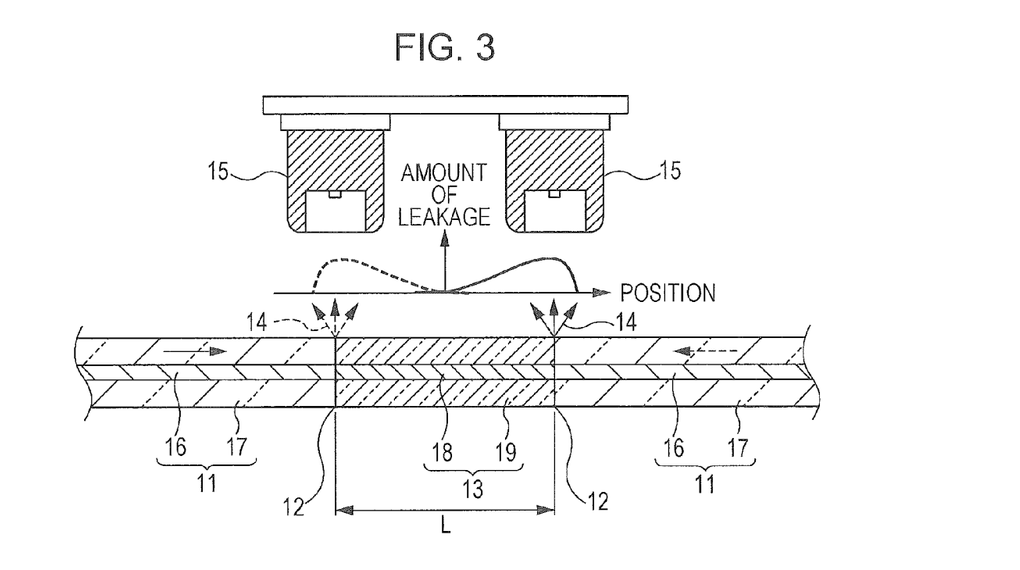
FIG. 3 is a cross-sectional schematic view of a modification of the communication light detecting structure illustrated in FIG. 1.

Alternatively, as illustrated in FIG. 3, the length L of the leakage optical fiber 13 may be increased such that there is little overlap between the distributions of the amount of the leakage light 14 at the optical connection portions 12 on the right and left in FIG. 2. At the same time, light detecting units 15 may be placed above the respective optical connection portions 12 on the right and left in FIG. 2. This makes it possible to detect not only the presence of communication light, but also the direction of the communication light.

Specifically, the light detecting unit 15 placed above the optical connection portion 12 on the right in FIG. 3 detects the presence of only the communication light propagating from the left to right in FIG. 3, and the light detecting unit 15 placed above the optical connection portion 12 on the left in FIG. 3 detects the presence of only the communication light propagating from the right to left in FIG. 3. Therefore, by checking which of the light detecting units 15 is detecting the leakage light 14, it is possible to detect not only the presence of communication light, but also the direction of the communication light.

Varying the length L of the leakage optical fiber 13 makes it possible not only to shift the position at which the amount of the leakage light 14 reaches a maximum, but also to periodically change the maximum value of the amount of the leakage light 14.

Additionally, by varying the refractive index of the core 18 of the leakage optical fiber 13, that is, by varying the relationship between the refractive indices of the cores 16 and 18 of the communication optical fiber 11 and the leakage optical fiber 13, it is possible to shift the phase of the maximum value of the amount of the leakage light 14.

Figure 4:
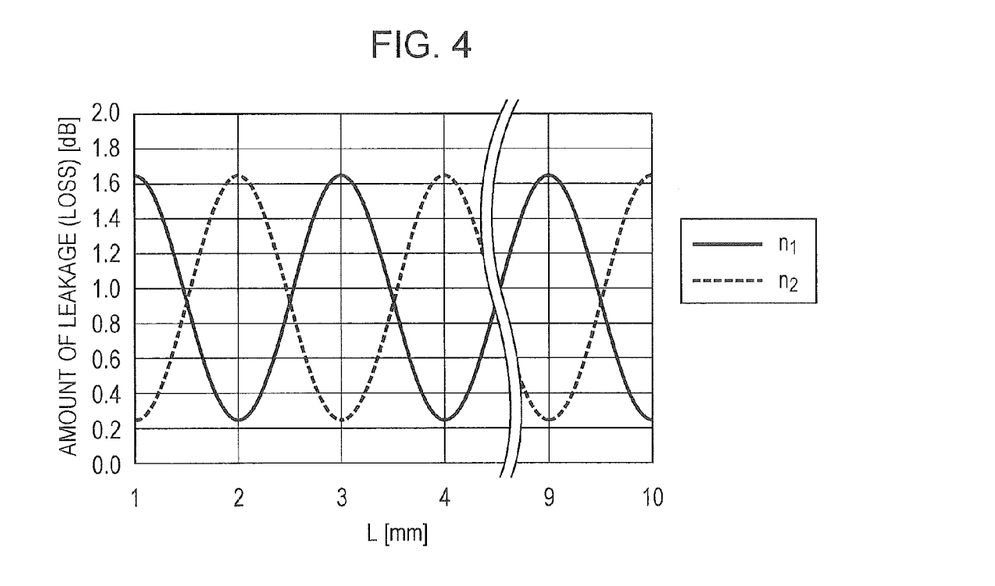
FIG. 4 illustrates a relationship between the length of a leakage optical fiber and the amount of leakage light.

For example, as illustrated in FIG. 4, when the refractive index of the core 18 of the leakage optical fiber 13 is set to a predetermined refractive index $n_1$, the amount of the leakage light 14 is maximized by setting the length L of the leakage optical fiber 13 to 1 mm, 3 mm, 5 mm, etc., and the amount of the leakage light 14 is minimized by setting the length L of the leakage optical fiber 13 to 2 mm, 4 mm, etc.

On the other hand, as illustrated in FIG. 4, when the refractive index of the core 18 of the leakage optical fiber 13 is set to a predetermined refractive index $n_2$, the amount of the leakage light 14 is maximized by setting the length L of the leakage optical fiber 13 to 2 mm, 4 mm, etc., and the amount of the leakage light 14 is minimized by setting the length L of the leakage optical fiber 13 to 1 mm, 3 mm, 5 mm, etc.

In the region where the length L of the leakage optical fiber 13 is less than 1 mm, the distance between the two optical connection portions 12 is too small, so that the leakage light 14 from one of the optical connection portions 12 may enter the communication optical fiber 11 through the other of the optical connection portions 12. This may adversely affect the communication light transmitted through the communication optical fiber 11.

If the two optical connection portions 12 are each formed by a fusion portion and the length L of the leakage optical fiber 13 is less than 1 mm, the distance between the fusion portions is too small, so that the entire leakage optical fiber 13 is heated twice during fusion. This may significantly change the refractive index distribution of the leakage optical fiber 13 (between the optical connection portions 12), and may further adversely affect the communication light transmitted through the leakage optical fiber 13 or the communication light that enters the leakage optical fiber 13 from the communication optical fiber 11.

For the reasons described above, the region where the length L of the leakage optical fiber 13 is less than 1 mm is deemed to be an unstable region and hence omitted in FIG. 4.

To completely eliminate the adverse effects described above and prevent an increase in transmission loss, the length L of the leakage optical fiber 13 is preferably at least 1 mm, and more preferably 2 mm or more.

The upper limit of the length L of the leakage optical fiber 13 may be set, for example, such that when the communication light detecting structure 10 is applied to a communication light detecting optical connector 50 (described below), the size of the communication light detecting optical connector 50 does not exceed that of an optical connector of related art (e.g., the upper limit of the length L may be 9 mm or less).

As described above, adjusting the length L of the leakage optical fiber 13 can control the amount of the leakage light 14. Therefore, the amount of the leakage light 14 can be easily designed to suit the application of the communication light detecting structure 10. For example, when a low-sensitivity, low-cost light receiving element is used as the light detecting unit 15 and an increase in transmission loss can be tolerated to a certain degree, the amount of the leakage light 14 can be designed to be maximized by adjusting the length of the leakage optical fiber 13.

Also, simply by varying the relationship between the refractive indices of the cores 16 and 18 of the communication optical fiber 11 and the leakage optical fiber 13, or by varying the length L of the leakage optical fiber 13 depending on the required characteristics, the amount of the leakage light 14 can be accurately controlled to a design value.

Unlike the light transmissive resin described above, the leakage optical fiber 13 suffers little degradation over time. Therefore, the communication light detecting structure 10 can maintain a stable amount of the leakage light 14 over a long period of time.

As described above, the light transmissive resin is not used to manufacture the communication light detecting structure 10 of the present embodiment. Therefore, the amount of leakage light is not changed either by entry of air bubbles during charging of the light transmissive resin, or by changes in refractive index of the light transmissive resin with changing environmental temperature. It is thus possible to reduce product-to-product variations and maintain a stable amount of leakage light over a long period of time.

Applications of the communication light detecting structure 10 will now be described.

Figure 5:
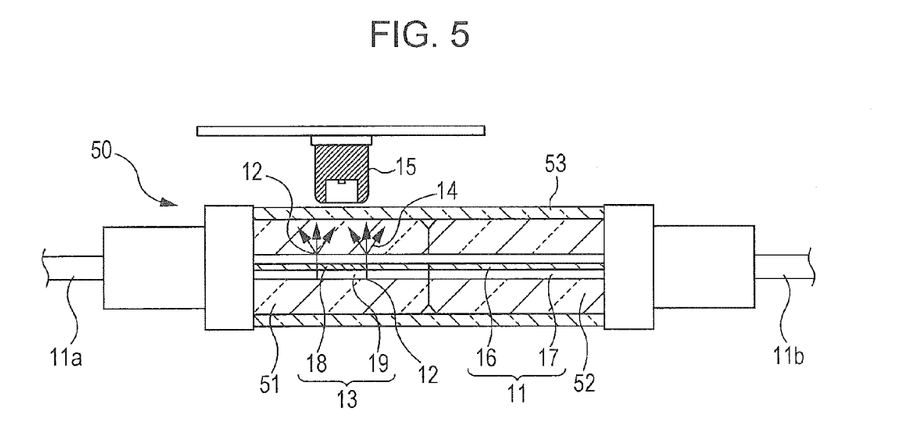
FIG. 5 is a cross-sectional schematic view of a communication light detecting optical connector including the communication light detecting structure illustrated in FIG. 1.

A first application is the communication light detecting optical connector 50 illustrated in FIG. 5. The communication light detecting optical connector 50 is configured to optically connect a server-computer-side optical fiber 11a and a client-computer-side optical fiber 11b forming the communication optical fiber 11, extract part of the communication light as the leakage light 14, allow the leakage light 14 to be detected by the light detecting unit 15, and enable the user to visually check the presence of the communication light.

In the communication light detecting optical connector 50, the leakage optical fiber 13 is optically connected to the middle of the server-computer-side optical fiber 11*a* via the optical connection portions 12 each formed by a fusion portion.

An end portion of the server-computer-side optical fiber 11*a* is contained in a ferrule 51, and an end portion of the client-computer-side optical fiber 11*b* is contained in a ferrule 52.

The ferrules 51 and 52 are made of a material (e.g., zirconia) transparent to communication light. Opposite end faces of the ferrules 51 and 52 are in physical contact (PC) with each other to allow the server-computer-side optical fiber 11*a* and the client-computer-side optical fiber 11*b* to be optically connected to each other. Therefore, the end faces of the ferrules 51 and 52 are ground to form the PC end faces.

To make the optical axis of the server-computer-side optical fiber 11*a* coincide with that of the client-computer-side optical fiber 11*b*, the ferrules 51 and 52 are contained in a split sleeve 53 which is also made of a material (e.g., zirconia) transparent to communication light.

The light detecting unit 15 is preferably configured separately from, and removably attached to, the communication light detecting optical connector 50. This is because this can reduce the size of the communication light detecting optical connector 50, enable the shared use of the single light detecting unit 15 among a plurality of communication light detecting optical connectors 50, and thus make a significant contribution to reduced costs.

Each of the components described above may be contained in a dust-proof, moisture-proof case to reduce the impact of dust and moisture.

Figure 6:
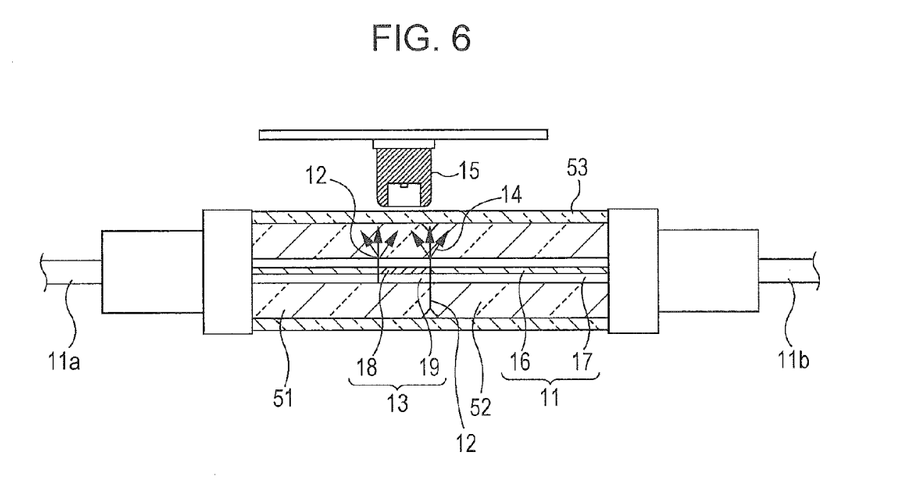
FIG. 6 is a cross-sectional schematic view of a modification of the communication light detecting optical connector illustrated in FIG. 5.

In the communication light detecting optical connector 50 described above, the leakage optical fiber 13 is optically connected to the middle of the server-computer-side optical fiber 11*a* via the optical connection portions 12 each formed by a fusion portion. Alternatively, as illustrated in FIG. 6, the leakage optical fiber 13 may be optically connected to the end portion of the server-computer-side optical fiber 11*a* via the optical connection portion 12 formed by a fusion portion, and optically connected to the client-computer-side optical fiber 11*b* via the optical connection portion 12 formed by a butt portion.

However, in view of the possibility that the amount of the leakage light 14 may vary from one product to another, it is more preferable that the optical connection portions 12 be each formed by a fusion portion, as in the communication light detecting optical connector 50 described above.

Before insertion or removal of the communication light detecting optical connector 50, the user can visually check the state of communication in the communication optical fiber 11. Therefore, the communication optical fiber 11 in use is very unlikely to be erroneously identified as not being in use, and it is possible to avoid serious communication failures caused by human error.

Figure 7:
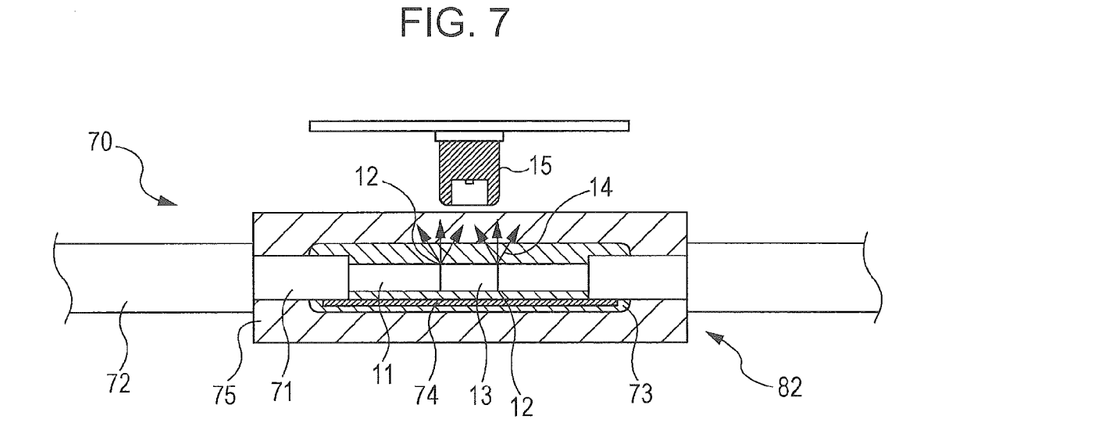
FIG. 7 is a cross-sectional schematic view of a communication light detecting optical cable including the communication light detecting structure illustrated in FIG. 1.

A second application is a communication light detecting optical cable 70 illustrated in FIG. 7. As illustrated, the communication light detecting optical cable 70 includes the communication optical fiber 11 configured to optically connect one device to another, extracts part of the communication light as the leakage light 14 from the communication optical fiber 11, allows the leakage light 14 to be detected by the light detecting unit 15, and enables the user to visually check the presence of the communication light.

In the communication light detecting optical cable 70, the periphery of the communication optical fiber 11, except the optical connection portions 12 and their surrounding area, is coated with a coating layer 71 and a optical cord sheath 72. The optical connection portions 12 are each formed by a fusion portion.

The communication light detecting optical cable 70 preferably further includes a protective member 73 configured to cover the optical connection portions 12, and a reinforcing member 74 configured to reinforce the optical connection portions 12. This is because since the optical connection portions 12 each formed by a fusion portion have a mechanical strength lower than that of other parts, it is necessary to protect and reinforce the optical connection portions 12.

The protective member 73 is preferably formed by a heat-shrinkable sleeve that covers the optical connection portions 12 and is transparent to the leakage light 14. This is because covering the entire optical connection portions 12 with the protective member 73 formed by a heat-shrinkable sleeve can facilitate protection of the optical connection portions 12.

The reinforcing member 74 is formed by a metal plate disposed along the optical connection portions 12 so as not to block the leakage light 14 toward the light detecting unit 15. When the reinforcing member 74 is made of a material transparent to the leakage light 14, the position of the reinforcing member 74 is not particularly limited.

Each of the components described above may be contained in a dust-proof, moisture-proof case 75 to reduce the impact of dust and moisture. The case 75 is preferably made of a material transparent to the leakage light 14, and if not, the case 75 needs to have an output port (not shown) for extraction of the leakage light 14.

Figure 8:
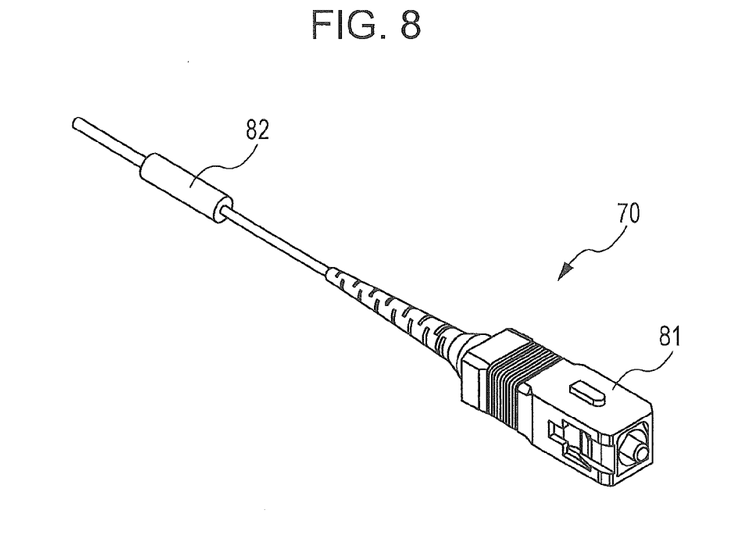
FIG. 8 is a general perspective view of the communication light detecting optical cable illustrated in FIG. 7.

In the communication light detecting optical cable 70, the presence and direction of communication light can be detected at an optical cord portion 82 smaller in size than an optical connector portion 81 as illustrated in FIG. 8. It is thus possible to avoid a detecting operation at the optical connector portion 81 dense with components, and possible to efficiently carry out a detecting operation in an area where optical cord portions 82 are bundled together.

As described above, according to the embodiments of the present invention, it is possible to provide a communication light detecting structure that can achieve reduced product-to-product variations and maintain a stable amount of leakage light over a long period of time, a communication light detecting optical connector that includes the communication light detecting structure, and a communication light detecting optical cable that includes the communication light detecting structure.

What is claimed is:

1. A communication light detecting structure comprising:
    a communication optical fiber configured to transmit communication light;
    a leakage optical fiber optically connected to the middle of the communication optical fiber via optical connection portions, the leakage optical fiber being different in core refractive index from the communication optical fiber; and
    a light detecting unit configured to detect part of the communication light leaking from the optical connection portions,
    wherein the communication optical fiber includes a first optical fiber and a second optical fiber,
    wherein the optical connection portions include:
        a first fusion portion where the first optical fiber and the leakage optical fiber are fused together; and a second fusion portion where the leakage optical fiber and the second optical fiber are fused together, and
wherein the leakage optical fiber has a length of 1 mm or more.

2. The communication light detecting structure according to claim 1, wherein the communication optical fiber and the leakage optical fiber have a same core diameter.

3. The communication light detecting structure according to claim 1, wherein the communication optical fiber and the leakage optical fiber have the same cladding refractive index.

4. The communication light detecting structure according to claim 1, wherein the communication optical fiber and the leakage optical fiber comprise a single optical fiber.

5. The communication light detecting structure according to claim 1, further comprising a protective member configured to cover the optical connection portions.

6. The communication light detecting structure according to claim 1, further comprising a reinforcing member configured to reinforce the optical connection portions.

7. A communication light detecting optical connector comprising the communication light detecting structure according to claim 1.

8. A communication light detecting optical cable comprising the communication light detecting structure according to claim 1.

9. The communication light detecting structure according to claim 1, wherein the leakage optical fiber is positioned between the first fusion portion and the second fusion portion and has the length of 1 mm or more, thereby preventing transmitted and/or entered communication light from being affected.

10. The communication light detecting structure according to claim 9, wherein the communication optical fiber is once spliced.

11. The communication light detecting structure according to claim 1, wherein the communication optical fiber is once spliced.

12. The communication light detecting structure according to claim 1, wherein the leakage optical fiber includes a first optical fiber and a second optical fiber.

13. The communication light detecting structure according to claim 12, wherein the first fusion portion fuses together the first optical fiber of the leakage optical fiber and the first optical fiber of the communication optical fiber.

14. The communication light detecting structure according to claim 12, wherein the first fusion portion fuses together the first optical fiber of the leakage optical fiber and the first optical fiber of the communication optical fiber, and
wherein the second fusion portion fuses together the second optical fiber of the leakage optical fiber and the second optical fiber of the communication optical fiber.

15. The communication light detecting structure according to claim 12, wherein the first optical fiber of the leakage optical fiber and the first optical fiber of the communication optical fiber have a same diameter.

16. The communication light detecting structure according to claim 12, wherein the second optical fiber of the leakage optical fiber and the second optical fiber of the communication optical fiber have a same diameter.

17. The communication light detecting structure according to claim 1, wherein the leakage optical fiber includes a first optical fiber and a second optical fiber,
wherein the first fusion portion fuses together the first optical fiber of the leakage optical fiber and the first optical fiber of the communication optical fiber,
wherein the second fusion portion fuses together the second optical fiber of the leakage optical fiber and the second optical fiber of the communication optical fiber,
wherein the first optical fiber of the leakage optical fiber and the first optical fiber of the communication optical fiber have a same diameter, and
wherein the second optical fiber of the leakage optical fiber and the second optical fiber of the communication optical fiber have a same diameter.

18. The communication light detecting structure according to claim 1, wherein the light detecting unit is disposed between the first fusion portion and the second fusion portion.

19. The communication light detecting structure according to claim 1, further comprising a second light detecting unit,
wherein a substantial center of the light detecting unit is disposed above the first fusion portion, and
wherein a substantial center of the second light detecting unit is disposed above the second fusion portion.

20. A communication light detecting structure comprising:
a communication optical fiber configured to transmit communication light;
a leakage optical fiber optically connected to the communication optical fiber via optical connection portions, the leakage optical fiber being different in core refractive index from the communication optical fiber; and
a plurality of light detecting units configured to detect part of the communication light leaking from the optical connection portions,
wherein the communication optical fiber includes a first optical fiber and a second optical fiber,
wherein the optical connection portions include:
a first fusion portion where the first optical fiber and the leakage optical fiber are fused together; and
a second fusion portion where the leakage optical fiber and the second optical fiber are fused together, and
wherein a substantial center of a first light detecting unit of the plurality of light detecting units is disposed above the first fusion portion, and
wherein a substantial center of a second light detecting unit of the plurality of light detecting units is disposed above the second fusion portion.

* * * * *